(12) United States Patent
Bruell

(10) Patent No.: US 8,176,673 B2
(45) Date of Patent: May 15, 2012

(54) ATTACHABLE AND DETACHABLE VIBRATION GENERATING DEVICE FOR A FISHING ROD

(75) Inventor: Paul Alexander Bruell, Dudley, MA (US)

(73) Assignee: Paul A. Bruell, Dudley, MA (US)

( * ) Notice: Subject to any disclaimer, the term of this patent is extended or adjusted under 35 U.S.C. 154(b) by 478 days.

(21) Appl. No.: 12/584,613

(22) Filed: Sep. 9, 2009

(65) Prior Publication Data

US 2010/0275500 A1     Nov. 4, 2010

(51) Int. Cl.
     *A01K 87/00*      (2006.01)
(52) U.S. Cl. .............................................. 43/19.2; 43/25
(58) Field of Classification Search ................... 43/19.2, 43/25, 26.1
See application file for complete search history.

(56) References Cited

U.S. PATENT DOCUMENTS

| | | | | |
|---|---|---|---|---|
| 2,624,145 A * | 1/1953 | Wehn | ............................. | 43/17.1 |
| 2,746,198 A * | 5/1956 | Smith | ............................. | 43/19.2 |
| 3,789,534 A * | 2/1974 | Yankaitis | ....................... | 43/19.2 |
| 4,528,767 A * | 7/1985 | Smith, Jr. | ....................... | 43/19.2 |
| 4,700,501 A * | 10/1987 | Bryan | ............................. | 43/19.2 |
| 4,821,448 A * | 4/1989 | Lindaberry | .................... | 43/19.2 |
| 4,916,847 A * | 4/1990 | Rusgo | ............................. | 43/19.2 |
| 5,036,616 A * | 8/1991 | Wilsey | ............................. | 43/26.1 |
| 5,842,301 A * | 12/1998 | Cassem | .............................. | 43/25 |
| 6,785,998 B2 * | 9/2004 | Seidler | ............................. | 43/19.2 |
| 6,836,995 B1 * | 1/2005 | Zernov | ............................. | 43/19.2 |
| 2007/0107293 A1 * | 5/2007 | Hendricks | ....................... | 43/19.2 |

* cited by examiner

*Primary Examiner* — Christopher P Ellis

(57) ABSTRACT

An elongated vibration generating device with a self contained vibration generating mechanism having its own power source including a battery driven motor, and eccentric weight and means to vary the vibration that can be easily attached to an ordinary fishing rod having a reel and line mounted thereon to cause the fishing rod shaft to vibrate in a manner to cause a bait or lure attached to the line to vibrate in a selective manner to attract fish. The device is firmly detachably attached to a fishing rod shaft by the co-acting combination of: (1) a soft and resilient extension depending from one end of the device and having a curvilinear cavity defined by a wall adapted to frictionally engage the top of a fishing rod shaft, and a first strap which is fixably attached at one end to the device above the extension wrapped around the fishing rod and the extension, with the other end of the strap adjustably secured to the fixed end of the strap by a hook and loop fastening system; (2) a pair of spaced metal or hard plastic vibration-transmitting nubs depending from the device at the opposite end from the extension, adjacent the vibration generating mechanism, for self-aligning mounting on the rod, and a second strap fixably attached at one end to the device above the spaced projections, with the other end of the strap wrapped around the fishing rod and adjustably secured to the device by a hook and loop fastening system.

8 Claims, 5 Drawing Sheets

ATTACHABLE AND DETACHABLE VIBRATION GENERATING DEVICE FOR A FISHING ROD

BACKGROUND OF INVENTION

The present invention relates to a vibration generating device that is attachable to and detachable from one or more fishing rods of the same cross-sectional dimension, or to and from fishing rods of different cross-sectional dimensions, by an attachment means that makes such attachment, detachment and re-attachment, rapid and easy, yet once the attachment is made, firmly holds the device on the rod to which it is attached, even when the device is subjected to the extreme forces exerted on it and the attachment means by the vibrations generated by the vibration device, as well as the forces produced by the motion of the rod in casting.

It is known that if a fishing rod can be made to vibrate it will cause a lure attached to the end of the line to move in a fluttering action that attracts fish to strike. Some prior art devices attempted to achieve this by manufacturing a rod that contains a vibrator as an integral part of the device, such as, for example, U.S. Pat. Nos. 6,785,998 and 6,836,995. This had the disadvantage that the user had to buy the particular rod. Not only is such rod costly, but it limits the user to that particular rod. Fishermen are very particular about rods and the action that the rods play in casting a lure and playing and landing a fish, and want to have the freedom to select from a variety of rods of different lengths, materials and action.

Other prior art devices such as U.S. Pat. Nos. 4,700,501 and 3,789,534 have detachable vibration devices which are cumbersome to attach, and have the line passing through the vibrating device and then through the eyelets of the rod. The feeding of the line modifies the particular inter-action of the rod reel and line intended by the manufacturer for the fishing line to pass from the reel through the eyelets to achieve a certain co-action between the rod and line which was intended by the manufacturer of the rod and tension on the line intended by the manufacturer of the reel to affect the action of the rod and the line in casting the line and in hooking and reeling in a fighting fish.

Other prior art devices such as U.S. Pat. No. 6,920,774 required the power supply and switching and electrical adjustments to be placed separate from the fishing rod and connected by wires. This is not only cumbersome but it can also interfere with the freedom to hold the rod at any angle when casting and can cause the wire to become entangled with other items in the boat or on the dock.

Still other devices had means for attaching a vibrating mechanism to a rod in a manner where the attachment means were cumbersome and difficult to attach and detach. This is a problem not only in the initial installation, but when a fisherman want to use a vibration apparatus for only part of their fishing day, and to try some fishing without it, much as they change lures when the fish are not biting to the degree that the fisherman desires.

Moreover, most fishermen have more than one rod, and want to change the rod either to go after different kinds of fish, or because they want to try different kinds of rod action. Each of the different rods may have different cross-sectional dimensions of the shaft, complicating or prohibiting the attachment of a vibrating device on a range of different fishing rods.

An inherent problem in attaching, anything, such as a vibration generating mechanism, to a fishing rod, is that the finished surface of the rod is often slippery. This is because a special waterproof coating that is placed on many rods gives the rod a slippery surface. This finish can adversely effect not only the ease by which a vibrator can be attached in proper alignment to a fishing rod during the fishing operation due to the tendency of the device to slip during such installation, but it will also increase the tendency of the attachment means to slip during casting a lure and landing a fish.

Accordingly, for the foregoing reasons, there is a need for a fisherman to have a vibrating device that can be quickly and simply attached and unattached either to the same, or another fishing rod of the same or different cross-sectional dimensions easily and quickly, yet will remain in the same firm attachment for a prolonged time and not become loosened during the casting of a lure and landing of a fish.

SUMMARY OF THE INVENTION

An object of the present invention is to provide a means of rapidly and firmly attaching a vibration generating device to a fishing rod.

Another object is to provide a means to rapidly and firmly attach a vibration generating device, in a good vibration transmission contact, on a first fishing rod of one cross-sectional dimension and rapidly detach it from the rod and quickly and firmly attach it to another rod, of the same or different cross-sectional dimensions than the first rod.

The foregoing objects are provided by an attachment means that resists movement of the vibration generating device axially and circumferentially when the device is initially placed on a rod, as well as during the casting of a lure and landing of a fish, by a combination of the interacting elements of a resilient soft rubber or silicone extension having a concave downward facing cavity to establish firm frictional engagement of the extension on the upper surface of the fishing rod shaft when a first strap means depending from the device holds the device in tight engagement with the rod to secure the device against axial movement on the rod when the first strap, having one end fixably attached to the device, wraps around the rod to compress the soft extension onto the rod, with the free end of the strap then secured to the fixed end by mating surfaces on each end of the strap; and a pair of self-aligning, vibration transmitting nubs projecting downward from a vibrating housing, which is spaced from the soft resilient extension, with the nubs spaced from each other perpendicularly to the center line of the housing and urged into a frictional biting engagement with the fishing rod by a second strap means which is attached at one end to the vibration generating housing, which urges the nubs into tight vibration transmitting frictional contact with the rod, and attached at the other end by mating surfaces to the said attached end of the strap to secure the device against rotational movement on the rod when the second strap is tightened about the rod, whereby, due to such combination, the device is effectively secured against movement axially of, and rotationally on, a first fishing rod shaft of one cross-sectional dimension or when the device is detached from the first rod, and placed on a rod having a different cross-sectional dimension.

BRIEF DESCRIPTION OF THE DRAWINGS

Embodiments of the present invention are described in detail below with reference to the attached drawing figures, wherein.

DETAILED DESCRIPTION OF THE PREFERRED EMBODIMENTS

Figure 1:
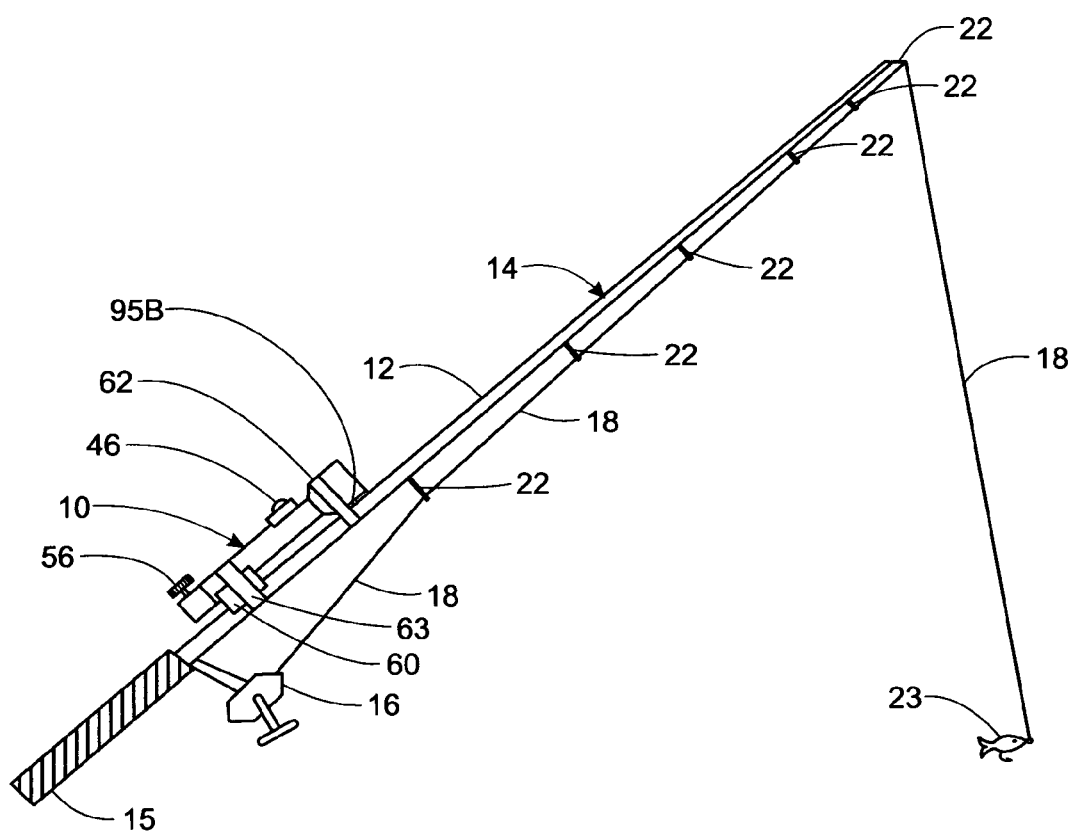
FIG. 1 is a side view of the device of the current invention, assembled on the shaft of a conventional fishing rod that has a conventional reel that feeds a conventional line through the conventional loops of the shaft of the rod, with a lure mounted at the end of the line.

FIG. 1 shows an assembled side view of the device 10 in accordance with the preferred embodiment of the present invention mounted above the shaft 12 of a conventional fishing rod 14 adjacent its handle 15. A conventional reel 16 is mounted below the handle. A fishing line 18 passes directly from the reel 16 through the conventional eyelets 22 of the shaft 12 and has a lure 23 attached at its end.

Figure 2:
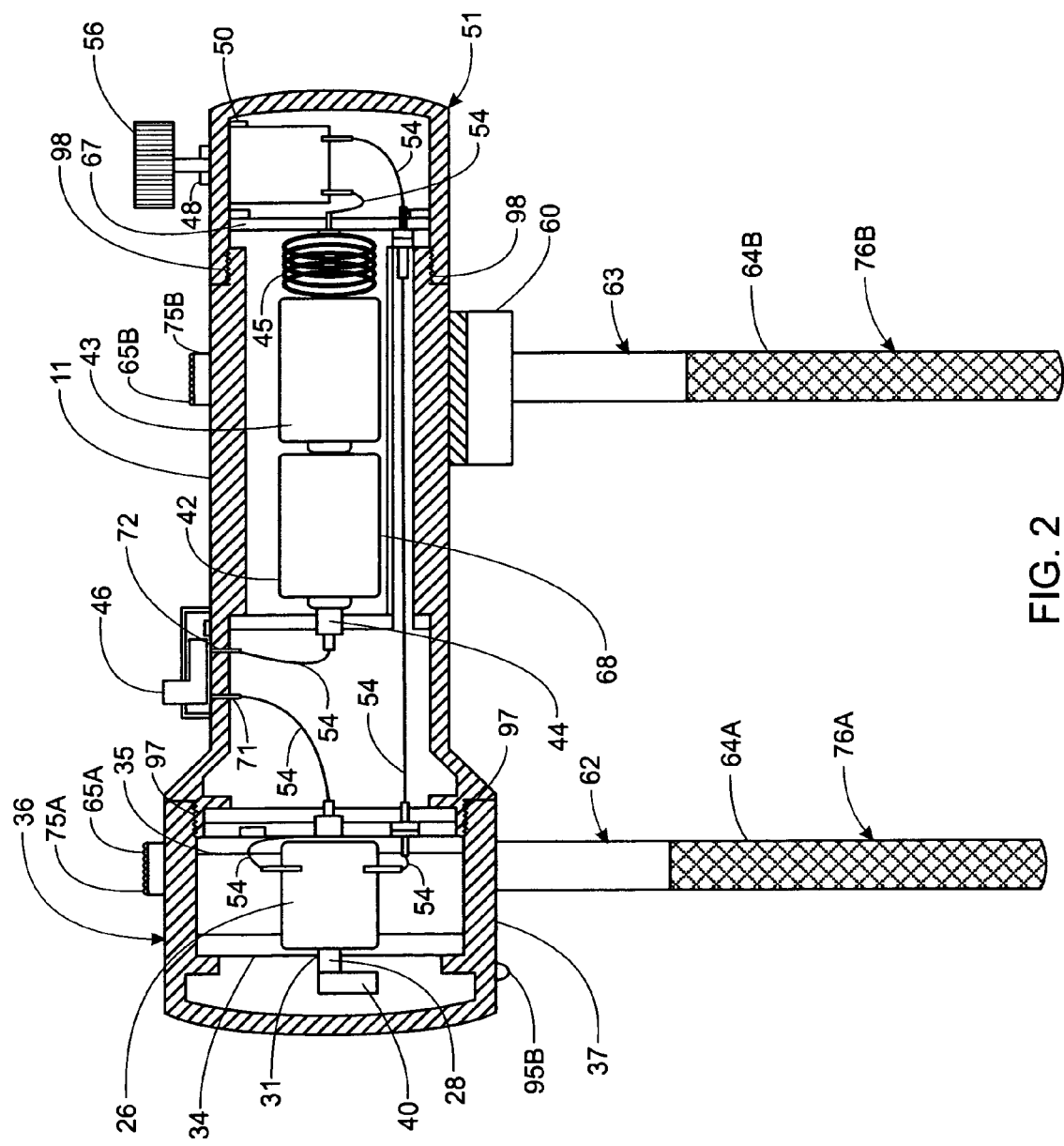
FIG. 2 is a cross-sectional side view of the device prior to assembly on the fishing rod taken along the lines 2-2 in FIG. 4.
Figure 4:
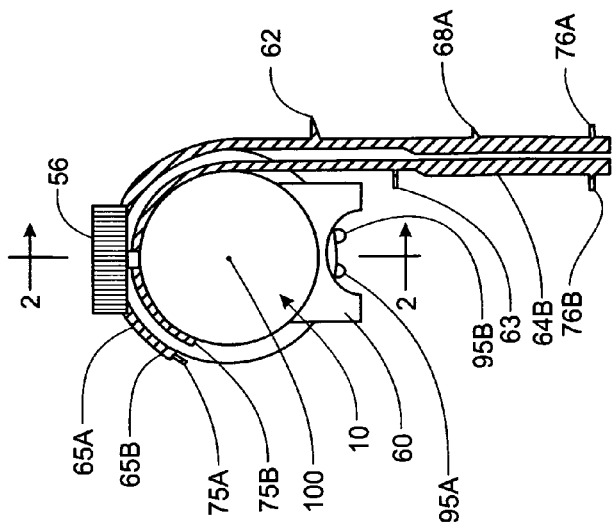
FIG. 4 is a rear view of the device prior to assembly on the fishing rod and showing the extension, the nubs and the straps having hook and loop mating surfaces.
Figure 3:
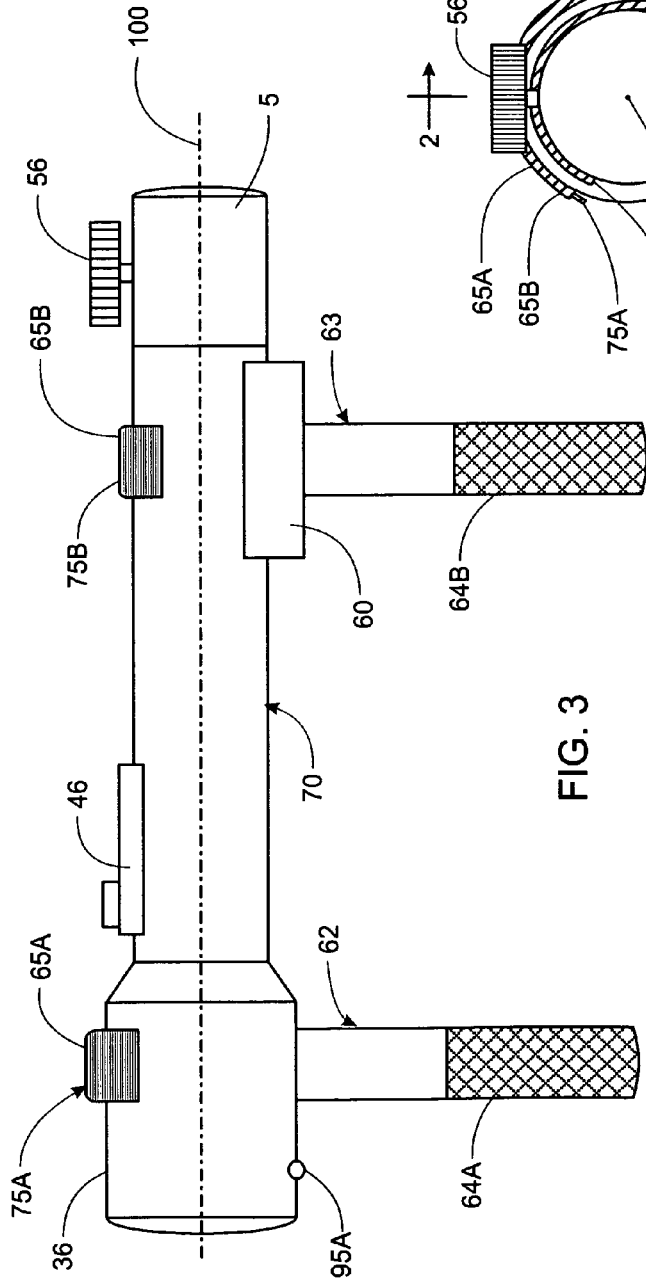
FIG. 3 is a side elevation view of the device prior to assembly on the fishing rod.

FIG. 2 shows a partially cross sectional and partially broken away side elevation view of the device 10 prior to its attachment to the shaft 12 of the conventional fishing rod 14. The device 10 has an elongated hollow cylindrical casing 11 of a water-proof material such as hard plastic. At one end of the device 10 an electric motor 26 that drives a central shaft 28 is mounted in a compression fit between two cylindrical walls 34 and 35 in a removable housing 36, having a pair of vibration transmitting nubs 95A and 95B (as shown in FIG. 4). Referring again to FIG. 2, shaft 28 projects through an opening 31 in the front wall 34 and has a weight 40 eccentrically mounted thereon. When the windings (not shown) of the motors are energized, the shaft 28 rotates the eccentric weight 40 to produce vibrations.

In the middle portion of the device 10, means is provided to mount a power supply in the form of a pair of series connected batteries, such as "AA" batteries 42 and 43 mounted in a channel 68 between a contact button 44 on one cylindrical wall 66 and a metallic spring 45 mounted on another wall 67, as is known in the flashlight and other electrical arts.

An "on/off" switch 46, shown generally and schematically, is mounted on and through the casing 11 of the device 10, with the switching elements 71 and 72 of the switch 46 providing open and closed series electrical connection between the batteries 42 and 43 and the other elements connected in series thereto whereby the activation of the motor 26 and the vibrations it generates can be turned "on" and "off".

A rheostat 50 to regulate the speed of the motor 26 is mounted on and through the casing 48 of a housing 51 at the opposite end of the device 10 from the motor 26. The rheostat 50, the on/off switch 46, and the windings of the motor 26 are connected in series electrical connection with the batteries 42 and 43 by a plurality of wires 54, the button 44 and the spring 45. The rheostat 50 is a conventional rheostat as known in the rheostat art and has a rotational knob 56 for varying the internal resistance (not shown) of the rheostat, and thus the current flowing there through, as is well known in the rheostat art. When the on/off switch 46 is "on", the current from the batteries 42 and 43 passes through the wirings of the motor 26 to cause the motor shaft 28 and its eccentrically mounted weight 40 to rotate, causing vibrations to be generated and pass through the walls 34 and 35 and out to the outer face 37 of the housing 36. When the device 10 is secured on a fishing rod shaft 12, as described hereinafter, and the on/off switch is "on", the fisherman can then manually turn the knob 56 of the rheostat 50 to adjust the current flowing through the windings of the electric motor 26 to vary the speed of rotation of the motor shaft 28 to modulate the frequency and amplitude of the vibrations transmitted to the outer face 37 of the housing 36 and then (FIG. 1) to the fishing rod shaft 12 and its line 18 and then to the lure 23.

Figure 7:
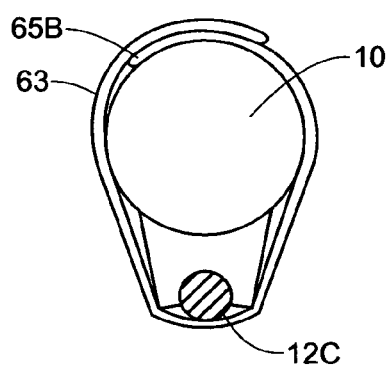
FIG. 7 is an illustrative cross sectional end view of a modification of the device mounted on a small diameter fishing rod shaft where the extension is sufficiently resilient to cause the extension cavity wall to contract upon the application of a strap to the extension to the fishing rod shaft.
Figure 8:
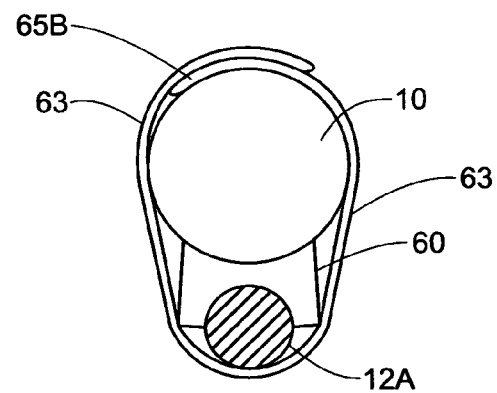
FIG. 8 is an illustrative cross sectional end view of the device of FIG. 6 mounted on a fishing rod shaft, with the extension and a strap in assembled position on a fishing rod shaft.

Turning now to FIGS. 2, 3, 4, 5, 6, 7, 8 and 9, the preferred embodiment of the means to attach the device 10 to a fishing rod includes a relatively resilient and soft friction means in the form of an elongated soft rubber or silicone extension 60 which is attached to and depends downwardly from, the bottom of the device 10, such as by an adhesive (not shown). In the preferred embodiment, the extension 60 is of a length of at least two to two and one half inches, and has at its bottom an internal wall 61 defining a curvilinear in cross section cavity 74 which runs lengthwise of the device and opens downward from the device whereby the wall 61 of the cavity frictionally engages the top of the fishing rod shaft 12 to compress the extension 60 to urge the extension in tight engagement on an ordinary fishing rod 12 to resist slippage of the device axially of the fishing rod shaft 12 when a first strap 62, having one end 75A secured to the device 10 such as by adhesive (not shown), has a free end 76A which wraps around the rod to urge the inner wall 61 of the soft extension 60 into tight contact with the rod on which it is placed so as to compress the extension in tight frictional contact against the rod, such as shown in FIGS. 7 and 8, to restrain the extension, and the device 10 to which it is attached, from movement axially of the fishing rod. The free end of the strap 63 is then secured to the fixed end 75B by hooks 65B on the fixed end 75B mating with the eyes 64B, such as found in Velcro®.

Figure 10:
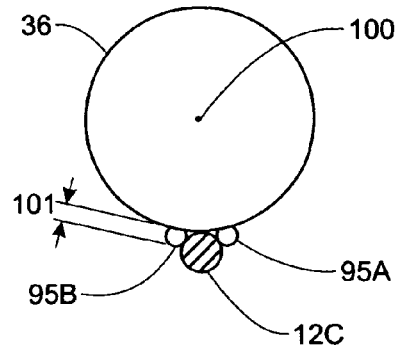
FIG. 10 is an illustrative partial cross-sectional end view of the housing portion of the device and nubs mounted on a small diameter fishing rod.
Figure 9:
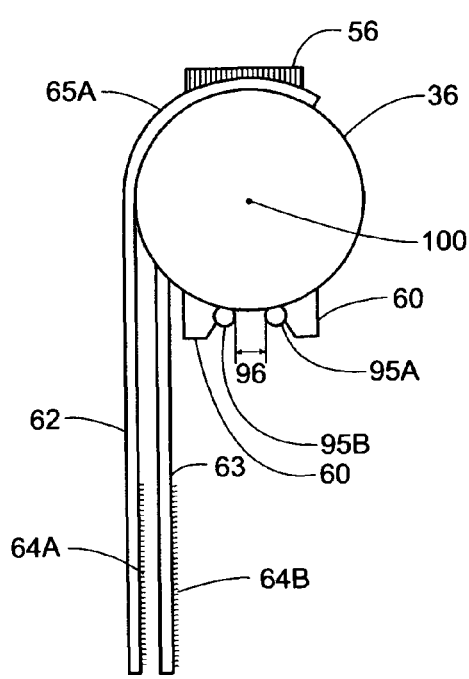
FIG. 9 is a front view of the device prior to assembly on a fishing rod showing the nubs, the extension and the straps having hook and loop surfaces.
Figure 11:
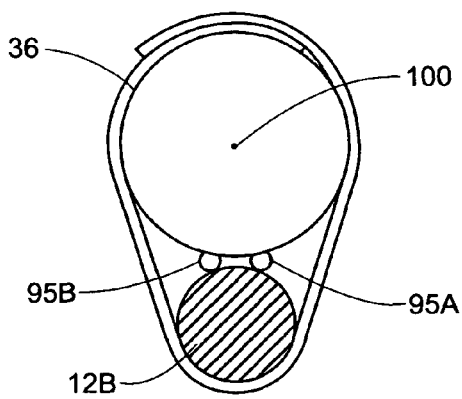
FIG. 11 is an illustrative partial cross-sectional end view of the housing portion of the device and nubs mounted on a large diameter fishing rod.

In further accordance with the preferred embodiment, the means to attach the device 10 to a fishing rod also includes a pair of rounded vibration transmitting nubs 95A and 95B, as shown in FIGS. 1, 2, 3, 4, 9, 10 and 11, made of metal or a hard plastic, which are attached to or part of the vibration generating housing 36. The nubs 95A and 95B are preferably rounded and each of a length 101 (as shown in FIG. 10) of $\frac{2}{16}$ to $\frac{3}{16}$ inches, and spaced 96 from each other (as shown in FIG. 9) by $\frac{3}{16}$ to $\frac{4}{16}$ inches in perpendicular alignment to the central axis 100 of the device 10. As shown in FIG. 10 when the device is placed on a fishing rod 12c, nub 95A rides down on one side of the fishing rod 12c, and nub 95B rides down on the other side of the rod 12c. The nubs self-adjust to the cross-sectional diameter of the fishing rod, riding higher on a larger diameter rod, as shown in FIG. 11 and riding lower on a smaller diameter rod, as shown in FIG. 10 The nubs 95A and 95B are then secured to the rod 12c by the weight of the device and by a second strap means 62 which at one end 75A is fixably attached to the housing 36 above and rearward of the nubs as shown in FIG. 2, such as by an adhesive (not shown) with the free end 76A of the strap 62 tightly wrapping about the rod and attached to the housing 36 as shown in FIG. 11 to urge and maintain the nubs 95A and 95B into a tight frictional biting engagement with the fishing rod to restrain the device 10 from moving rotationally about the fishing rod. The attachment of the free end of the strap 62 to its fixed end 75A is by hooks 65A on the fixed end 75A mating with the eyes 64A on the free end, such as found in Velcro®.

I have found that the straps not only act to urge the soft extension 60 and the nubs 95A and 95B into tight engagement with the fishing rod, but the soft extension 60 with its shock absorbent resiliency and resistance to movement of the device 10 axially of the fishing rod 12, and the nubs 95A and 95B with their biting frictional engagement on the rod 12 provides alignment for the device, and rotational movement of the device, about the rod 12, thereby combining to reduce the strain on the strap 62 and 63 resulting from the vibrations emanating from the vibration generating housing 36 and the forces resulting from the movement of the rod 12 during casting and landing a fish.

Figure 5:
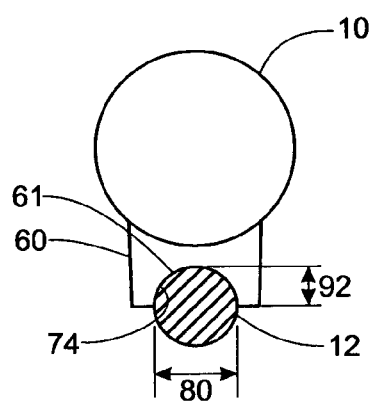
FIG. 5 is an illustrative partial cross sectional end view of the device mounted on a fishing rod shaft where the cavity defined by the wall at the bottom of the extension is the same size as the rod.
Figure 6:
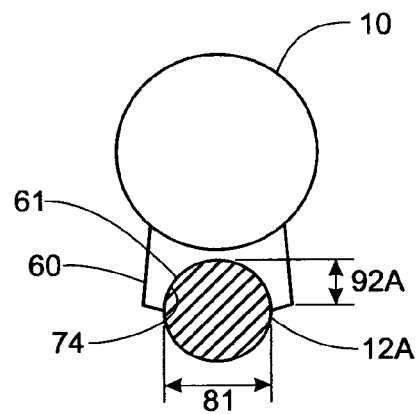
FIG. 6 is an illustrative cross sectional end view of a modification of the device mounted on a large diameter fishing rod shaft where the extension is sufficiently resilient to cause the extension cavity wall to expand on application of the extension to the fishing rod shaft.

Referring again to the extension 60, I have also found that in addition to providing shock absorption and prevention of movement of the device 10 axially on the rod 12, the shape of the cavity 61 defined by the wall 74 of the soft extension 60 can be adapted in manufacture to fit on fishing pole shafts of different diameters by varying the depth of the curvilinear-in-cross-section cavity 61 defined by the wall 74 and/or the durometer of the material of the extension 60. For example, FIG. 5 shows the wall 61 defining a cavity 74 which is deep, as at depth 92, engaging a fishing rod 12 having a small cross-sectional diameter. In such case, the wall 74 of extension 60 engages the fishing rod shaft half-way down the shaft. Unless the durometer of the extension is made soft as described later herein, such extension could not be pushed down on a larger diameter fishing rod, such as it is in FIG. 6. But in the present invention, where the extension 60 is of a soft durometer, the extension 60 co-acts with the above described wrapping means, as shown in FIGS. 7, and 8, the combination would hold the device 10 securely on the rod during the rigors of casting the lure and hooking, playing and landing the fish. I have found that when the durometer is soft, in the range between 30 and 45, the device can have a deep cavity, with its consequent frictional advantages, and will expand or contract to fit more than one size of rods. Such expansion of the extension 60 is demonstrated in FIGS. 6 and 8, and the contraction of Extension 60 is demonstrated in FIG. 7.

Similar to the soft extension 60, the nubs 95A and 95B of the present invention are self adjusting on rods of different diameters as described above, and illustrated in FIGS. 10 and 11, so that they also provide, in combination with the strap means 62, a means for ready secure attachment of the device 10 to fishing rods of different diameters, and securing the device 10 against rotational movement on each of such rods.

It is to be noted that the soft extension 60, and the nubs 95A and 95B, have an additional advantage in the initial assembly of the device 10 on rod 12. They provide a simple two-step assembly process wherein, by simply pushing the soft extension 60 and the nubs 95A and 95B down against the top of the fishing rod shaft the device is positively aligned and preliminarily secured so that when the straps are wrapped around and begun to be tighten, the device does not slip the desired position on the rod 12.

This is another advantage of the present invention, as compared to a device that would merely use straps for attaching a device to a rod. If the rod is slippery, it is difficult and time consuming to align the device on the rod and hold it in alignment without the device slipping on the rod while the straps are attempted to be attached.

In the preferred embodiment, the device 10 is of waterproof material and construction. The front and rear housings 36 and 51 can be removable for providing access to the vibrating mechanism and battery compartment and rheostat respectively for easy replacement thereof. While gaskets (not shown) could be used to maintain the water resistant nature of the device, if the threads 97 and 98 for attachment are tapered, as shown in FIG. 2, the need for gaskets can be eliminated.

Whereas, the present invention has been described with respect to specific embodiments thereof, it will be understood that various changes and modifications will be suggested to one skilled in the art and it is intended to encompass such changes and modifications as fall within the scope of the appended claims.

What is claimed is:

1. A vibration transmitting device adapted for rapid and secure attachment to and rapid detachment from fishing rods of different cross-sectional dimensions comprising of:
   An elongated casing,
   A source of electrical power mounted on said casing,
   A vibration transmitting housing mounted on said casing at one end thereof,
   Vibration generating means mounted on said casing and electrically connected to said source of electrical power so as to cause said housing to vibrate,
   A soft and resilient extension depending from said casing towards the other end thereof, said extension having at its bottom a cavity defined by a wall adapted to be able to frictionally engage at least two fishing rods having shafts of different cross-sectional dimensions,
   A first strap having one end fixably attached to the casing above the extension and a free end adapted to wrap around a fishing rod and be secured to the casing whereby the extension is urged into tight frictional engagement with the rod,
   A pair of nubs of vibration transmitting material extending downwardly from the vibration transmitting housing, said nubs spaced from each other whereby said projections are adapted to engage the outer surface of fishing rods of different cross-sectional dimensions to assist in the prevention of the device from rotation of the device about said rods,
   A second strap having one end fixably attached to the housing above and rearward of the nubs, and a free end adapted to wrap around a fishing rod and be secured to the housing so as to urge the nubs into tight frictional engagement with the rod.

2. A device in accordance with claim 1 wherein the extension has a durometer reading between 30 and 45.

3. A device in accordance with claim 1 wherein the nubs are spaced from each other from three-sixteenth to four sixteenth of an inch.

4. A device in accordance with claim 1 including vibration control means mounted on said casing to vary the degree of vibration produced by the device.

5. A device in accordance with claim 1 wherein the free ends of the first and second straps are attached to the fixed ends of the straps by hook and loop means.

6. A device in accordance with claim 1 wherein the vibration transmitting housing is detachable from the casing by means of tapered threads.

7. A device in accordance with claim 1 wherein the vibrations control housing is detachable from the casing by means of tapered threads.

8. A device in accordance with claim 1 where the nubs are attached to or are part of the housing in a perpendicular alignment to the longitudinal axis of the housing.

* * * * *